United States Patent
Sumi

(10) Patent No.: US 11,942,106 B2
(45) Date of Patent: Mar. 26, 2024

(54) APPARATUS FOR ANALYZING AUDIO, AUDIO ANALYSIS METHOD, AND MODEL BUILDING METHOD

(71) Applicant: Yamaha Corporation, Hamamatsu (JP)

(72) Inventor: Kouhei Sumi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 414 days.

(21) Appl. No.: 17/332,426

(22) Filed: May 27, 2021

(65) Prior Publication Data

US 2021/0287695 A1 Sep. 16, 2021

Related U.S. Application Data

(63) Continuation of application No. PCT/JP2019/044522, filed on Nov. 13, 2019.

(30) Foreign Application Priority Data

Nov. 29, 2018 (JP) .................. 2018-223863

(51) Int. Cl.
*G10L 25/51* (2013.01)
*F21V 23/00* (2015.01)
(Continued)

(52) U.S. Cl.
CPC ............ *G10L 25/51* (2013.01); *F21V 23/003* (2013.01); *G06F 3/14* (2013.01); *G10L 25/90* (2013.01)

(58) Field of Classification Search
CPC ....... G10L 25/51; G10L 25/90; F21V 23/003; G06F 3/14
See application file for complete search history.

(56) References Cited

U.S. PATENT DOCUMENTS

| 6,057,502 A * | 5/2000 | Fujishima ............... G10H 1/383 84/637 |
| 7,411,125 B2 * | 8/2008 | Yamada .................. G10H 1/383 84/637 |

(Continued)

FOREIGN PATENT DOCUMENTS

| JP | 2000-298475 A | 10/2000 |
| JP | 2004-163767 A | 6/2004 |

(Continued)

OTHER PUBLICATIONS

International Search Report (PCT/ISA/210) issued in PCT Application No. PCT/JP2019/044522 dated Jan. 28, 2021 with English translation (four (4) pages).

(Continued)

*Primary Examiner* — Olisa Anwah
(74) *Attorney, Agent, or Firm* — Crowell & Moring LLP

(57) ABSTRACT

An apparatus for analyzing audio includes a feature acquirer, an output apparatus, at least one memory, and at least one processor. The at least one processor is configured to execute a program stored in the at least one memory. The at least one processor is also configured to cause the feature acquirer to acquire a series of feature amounts of an audio signal. The at least one processor is also configured to generate boundary data by inputting the acquired series of feature amounts into a boundary estimation model that has learned relationships between: (i) a series of feature amounts, and (ii) boundary data representative of boundaries, each of the boundaries being between consecutive periods in each of which a chord is continuous.

17 Claims, 3 Drawing Sheets

(51) Int. Cl.
*G06F 3/14* (2006.01)
*G10L 25/90* (2013.01)

(56) References Cited

U.S. PATENT DOCUMENTS

| | | | | |
|---|---|---|---|---|
| 2002/0029685 | A1* | 3/2002 | Aoki | G10H 1/38 |
| | | | | 84/613 |
| 2014/0140536 | A1* | 5/2014 | Serletic, II | G06F 3/0481 |
| | | | | 381/98 |
| 2014/0238220 | A1* | 8/2014 | Nakamura | G10H 1/38 |
| | | | | 84/613 |
| 2014/0310011 | A1* | 10/2014 | Biswas | G10L 19/038 |
| | | | | 704/500 |
| 2016/0027420 | A1* | 1/2016 | Eronen | G10H 1/40 |
| | | | | 84/611 |
| 2019/0051276 | A1* | 2/2019 | Lathrop | G10G 1/02 |
| 2019/0251941 | A1* | 8/2019 | Sumi | G10H 1/0008 |
| 2020/0074982 | A1* | 3/2020 | McCallum | G10L 15/04 |

FOREIGN PATENT DOCUMENTS

| | | |
|---|---|---|
| JP | 2008-209550 A | 9/2008 |
| JP | 2015-31738 A | 2/2015 |
| JP | 2017-215520 A | 12/2017 |

OTHER PUBLICATIONS

Japanese-language Written Opinion (PCT/ISA/237) issued in PCT Application No. PCT/JP2019/044522 dated Jan. 28, 2021 (three (3) pages).
Maruo et al., "Code Recognition Based on Separation of Singing Voice, Accompaniment Sound, and Percussion Instrument Sound for Music Acoustic Signals", Information Processing Society of Japan, 2015, pp. 1-6, with English translation (18 pages).
International Search Report (PCT/ISA/210) issued in PCT Application No. PCT/JP2019/044522 dated Jan. 28, 2020 with English translation (four (4) pages).
Japanese-language Written Opinion (PCT/ISA/237) issued in PCT Application No. PCT/JP2019/044522 dated Jan. 28, 2020 (three (3) pages).
Japanese-language Office Action issued in Japanese Application No. 2018-223863 dated Jul. 5, 2022 with English translation (seven (7) pages).
English translation of document C2 (Japanese-language Written Opinion (PCT/ISA/237) previously filed on May 27, 2021) issued in PCT Application No. PCT/JP2019/044522 dated Jan. 28, 2020 (six (6) pages).
Chinese-language Office Action issued in Chinese Application No. 2019800739372 dated Sep. 13, 2023 with English translation (15 pages).

* cited by examiner

APPARATUS FOR ANALYZING AUDIO, AUDIO ANALYSIS METHOD, AND MODEL BUILDING METHOD

CROSS REFERENCE TO RELATED APPLICATION

This application is a Continuation Application of PCT Application No. PCT/JP2019/044522 filed Nov. 13, 2019, and is based on and claims priority from Japanese Patent Application No. 2018-223863, filed Nov. 29, 2018, the entire contents of each of which are incorporated herein by reference.

BACKGROUND

Field of the Invention

The present disclosure relates to techniques for analyzing audio signals.

Description of Related Art

There are a variety of techniques for estimating a chord from an audio signal representative of a sound, such as a singing voice or a performance sound of a piece of music, or other similar sound.

For example, Patent Document 1 (Japanese Patent Application Laid-Open Publication 2000-298475) discloses a technique for determining a chord, in which waveform data of input music are analyzed, and a frequency spectrum is obtained to determine the chord.

Patent Document 2 (Japanese Patent Application Laid-Open Publication 2008-209550) discloses a technique for identifying a chord, in which a probability density function of the fundamental frequency of an input sound is estimated, and a chord including a component sound of the fundamental frequency, the peak of which is in the estimated probability density function, is identified.

Patent Document 3 (Japanese Patent Application Laid-Open Publication 2017-215520) discloses a technique for estimating a chord by use of a trained neural network by machine learning.

In some cases, the same chord is continuous in a piece of music. A period in which the same chord is continuous will be referred to as a "consecutive period". In such a case, estimation of consecutive periods may be required. By the techniques recited in Patent Documents 1 to 3, chords may be estimated, and thereby estimating each consecutive period from the estimated series of chords. However, an incorrect estimation of a chord with the techniques recited in Patent Documents 1 to 3 may cause an incorrect estimation of a consecutive period.

SUMMARY

An aspect of this disclosure has, as an object, estimating a consecutive period with high accuracy by analysis of an audio signal.

To solve the above problems, a computer-implemented audio analysis method according to one aspect of this disclosure is an audio analysis method including acquiring a series of feature amounts of an audio signal, and generating boundary data by inputting the acquired series of feature amounts into a boundary estimation model that has learned relationships between: (i) a series of feature amounts, and (ii) boundary data representative of boundaries, each boundary being between consecutive periods in each of which a chord is continuous.

An audio analyzer according to an aspect of this disclosure is an audio analyzer including at least one memory, and at least one processor is configured to execute a program stored in the at least one memory, in which the at least one processor configured to acquire a series of feature amounts of an audio signal, and generate boundary data by inputting the acquired series of feature amounts into a boundary estimation model that has learned relationships between: (i) a series of feature amounts, and (ii) boundary data representative of boundaries, each boundary being between consecutive periods in each of which a chord is continuous.

A computer-implemented model building method according to one aspect of this disclosure is a model building method including acquiring training data, each including: (i) a series of feature amounts, and (ii) boundary data representative of boundaries, each boundary being between consecutive periods in each of which a chord is continuous, and building, by machine learning using the training data, a boundary estimation model that has learned relationships between: (i) a series of feature amounts, and (ii) boundary data representative of boundaries, each boundary being between consecutive periods in each of which a chord is continuous. Other objects, advantages and novel features of the present disclosure will become apparent from the following detailed description of one or more preferred embodiments when considered in conjunction with the accompanying drawings, in which:

DETAILED DESCRIPTION

Figure 1:
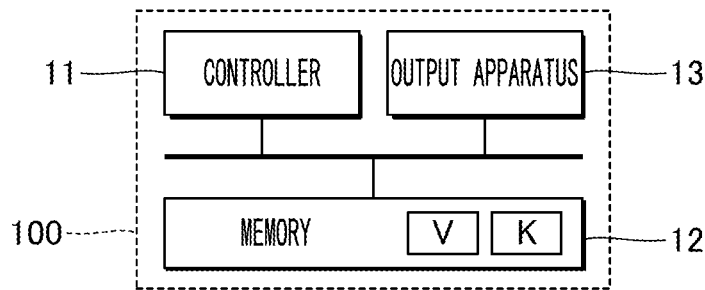
FIG. 1 is a block diagram of an audio analyzer.

FIG. 1 is a block diagram of an audio analyzer 100. The audio analyzer 100 is an information processing apparatus. The audio analyzer 100 analyses an audio signal V representative of a sound, such as a singing voice or a performance sound of a piece of music, or other similar sounds, and estimates by the analysis consecutive periods in the piece of music. Here, a consecutive period refers to a period in which a chord is continuous. In this embodiment, an example case is assumed in which consecutive periods are estimated in the piece of music.

The audio analyzer 100 is configured by a computer system and includes a controller 11, a memory 12, and an output apparatus 13. In one example, an information terminal, such as a cell phone, a smartphone, a personal computer and other similar devices, may be used as the audio analyzer 100. The output apparatus 13 is an electrical device, and executes operations according to the result obtained by analyzing audio signal V. Specifically, in one example, the output apparatus 13 is a display, and displays consecutive periods estimated from an audio signal V.

The controller 11 includes at least one processor that controls each element of the audio analyzer 100. The controller 11 includes one or more types of processors, examples of which include a Central Processing Unit (CPU), a Sound Processing Unit (SPU), a Digital Signal Processor (DSP), a Field Programmable Gate Array (FPGA), and an Application Specific Integrated Circuit (ASIC). The memory 12 refers to one or more memories configured by a recording medium, such as a magnetic recording medium or a semiconductor recording medium. The memory 12 holds a program executed by the controller 11 and a variety of data used by the controller 11. In one example, the memory 12 holds an audio signal V. The memory 12 may be configured by a combination of multiple types of recording medias. A portable memory medium detachable from the audio analyzer 100 or an online storage, which is an example of an external memory medium accessed by the audio analyzer 100 via a communication network, may be used as the memory 12.

Figure 2:
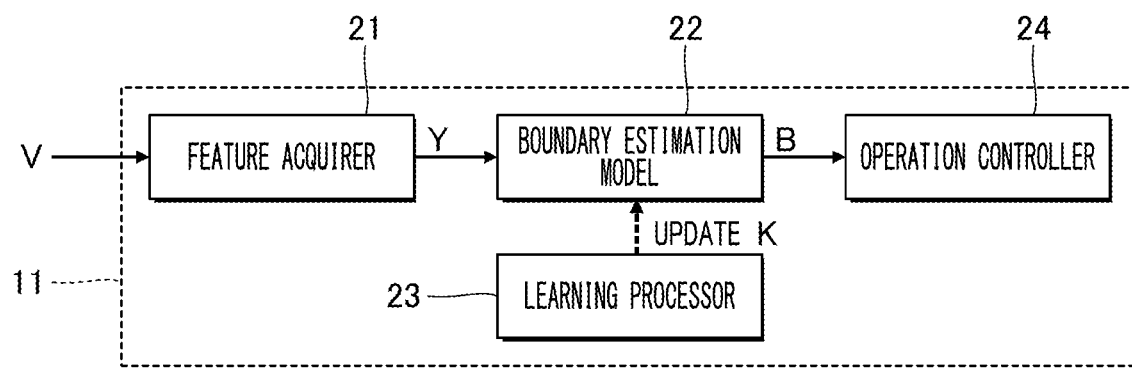
FIG. 2 is a block diagram showing functional configuration of the audio analyzer.

FIG. 2 is a block diagram showing an example of functions created by execution by the controller 11, of the program stored in the memory 12. The controller 11 creates a feature acquirer 21, a boundary estimation model 22, a learning processor 23, and an operation controller 24. The functions of the controller 11 may be created by use of multiple independent devices. Some or all of the functions of the controller 11 may be performed by electronic circuits therefor.

Figure 3:
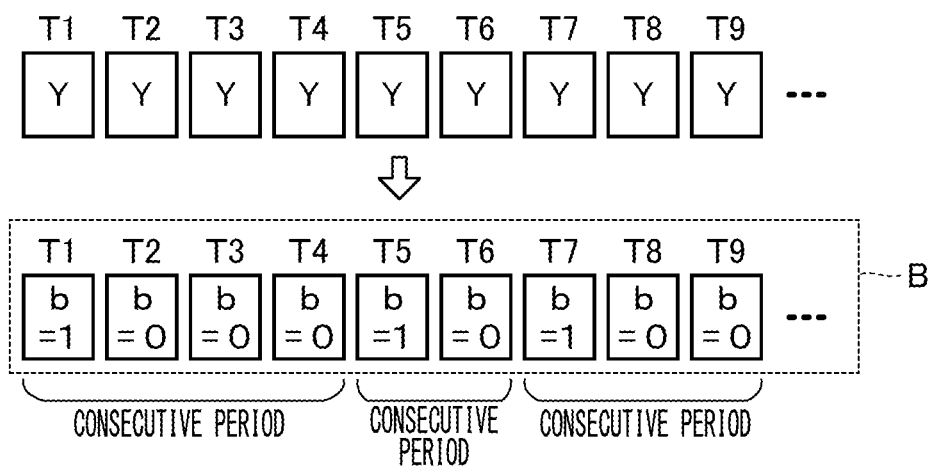
FIG. 3 is an explanatory diagram of feature amounts and boundary data.

The feature acquirer 21 extracts a feature amount Y from an audio signal V stored in the memory 12. As shown in FIG. 3, a feature amount Y is extracted for a unit period T (T1, T2, T3, . . . ). In other words, a series of feature amounts Y is generated from the audio signal V. In one example, each unit period T is a period corresponding to one beat of a piece of music. However, each unit period T may be defined as a fixed or variable length unit period, independently of a beat point of a piece of music.

Figure 4:
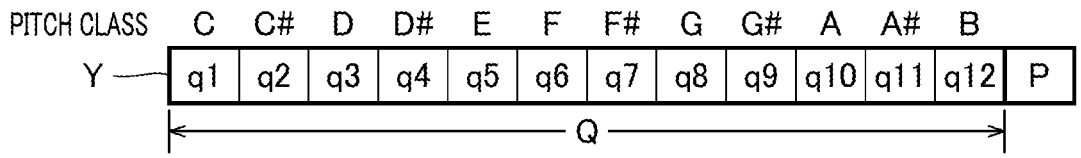
FIG. 4 is an explanatory diagram of a feature amount.

A feature amount Y of each unit period T refers to an index of an acoustic feature of a portion of an audio signal V, and relates to the portion within the unit period T. As shown in FIG. 4, in this embodiment, a feature amount Y includes a chroma vector Q and an intensity P. The chroma vector Q is a twelve-dimensional vector, and includes twelve intensity components q1 to q12 for twelve different pitch classes (specifically, twelve semitones of equal temperament). Each pitch class is a type of a pitch name that indicates the same pitch regardless of octave.

Here, any one intensity component included in the chroma vector Q will be denoted by qn (n=1 to 12). The intensity component qn of the chroma vector Q is represented by a numerical value, and is obtained by adding up an intensity of an audio component corresponding to the n th pitch class in the audio signal V over multiple octaves. The intensity P included in a feature amount Y is represented by sound volume or power over the entire bandwidth of the audio signal V.

As shown in FIG. 2, a series of feature amounts Y generated by the feature acquirer 21 is input into the boundary estimation model 22. The boundary estimation model 22 is a trained model that has learned relationships between the series of feature amounts Y and boundary data B. In other words, the boundary estimation model 22 receives an input of the series of feature amounts Y, and outputs the boundary data B.

Description of the boundary data B will be given below. For each feature amount Y in each unit period T, unit datum b is output from the boundary estimation model 22. As shown in FIG. 3, boundary datum B includes a series of unit data b, which correspond to respective unit periods T (T1, T2, T3, . . . ) on the time axis. The boundary datum B represents boundaries on the time axis, each of which is between a consecutive period and the subsequent consecutive period. Unit datum b corresponding to a unit period T is binary datum, and indicates whether a time point corresponding to the unit period T is at a boundary between consecutive periods. Specifically, in one example, unit datum b corresponding to a unit period T is set to "1" if the start point of the unit period T is at the boundary between consecutive periods. Otherwise, the unit datum b is set to "0". In other words, the numerical value "1" represented by unit datum b means that the unit period T corresponding to the unit datum b is at the head of the consecutive period. As is clear from the above description, the boundary estimation model 22 is a statistical estimation model that estimates boundaries, each of which is between consecutive periods, from the series of feature amounts Y. In this embodiment, the boundary datum B is a binary datum, and indicates, for each of the time points on a time axis, whether the time point corresponds to a boundary between consecutive periods.

The boundary estimation model 22 is obtained by a combination of the following (i) and (ii): (i) a program (e.g., a program module of artificial intelligence software) that causes the controller 11 to carry out operations for generation of the boundary data B from the series of feature amounts Y, and (ii) coefficients K applied to the operations. The coefficients K are set by machine learning (especially, deep learning) by use of training data, and then are stored in the memory 12. In one example, a recurrent neural network (RNN), such as Long Short Term Memory (LSTM), which is suitable for processing series of data, is used as the boundary estimation model 22. Other types of neural networks, such as convolutional neural networks (CNNs), may be used as the boundary estimation model 22.

As shown in FIG. 2, the operation controller 24 controls the output apparatus 13 in accordance with boundary datum B output from the boundary estimation model 22. In one example, the operation controller 24 causes the output apparatus 13 to display each consecutive period represented by the boundary datum B.

Figure 5:
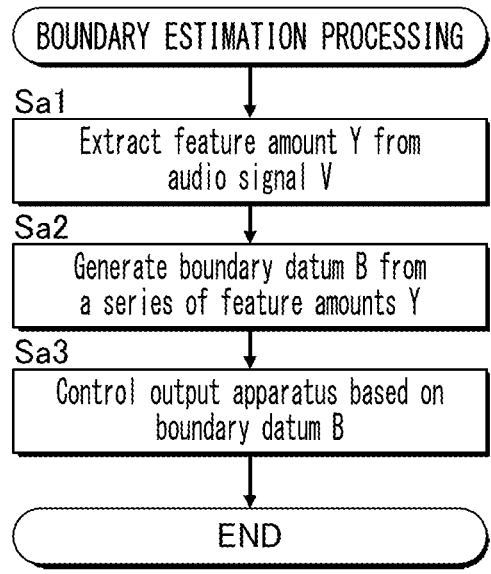
FIG. 5 is a flowchart showing an example of specific steps of boundary estimation processing.

FIG. 5 is a flowchart showing an example of boundary estimation processing in which boundaries, each of which is between consecutive periods, are estimated from an audio signal V. In one example, the boundary estimation processing is initiated by a user's instruction. At the start of the boundary estimation processing, for each unit period T, the feature acquirer 21 extracts a feature amount Y from an audio signal V stored in the memory 12 (Sa1). The boundary estimation model 22 generates boundary datum B from a series of feature amounts Y extracted by the feature acquirer 21 (Sa2). The operation controller 24 causes the output apparatus 13 to display a consecutive period represented by the boundary datum B output from the boundary estimation model 22 (Sa3). It is freely selectable for the content of the result of the estimation by the boundary estimation model 22. In one example, the score of the piece of music represented by the audio signal V may be displayed with a different display mode (e.g., color) for each consecutive period in the piece of music.

Figure 6:
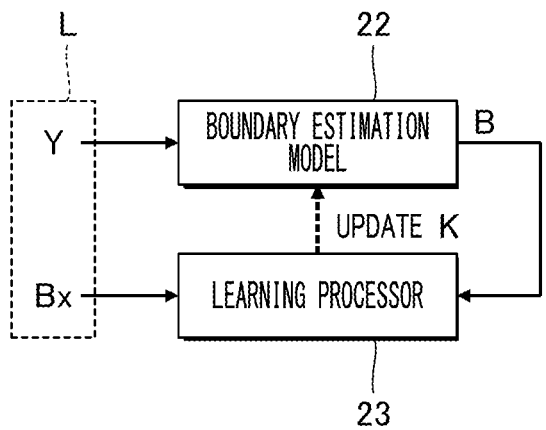
FIG. 6 is an explanatory diagram of operation of a learning processor.

The learning processor 23 shown in FIG. 2 sets, by machine learning (especially, deep learning), coefficients K of the boundary estimation model 22. The learning processor 23 sets the coefficients K by machine learning using the training data L that is stored in the memory 12. As shown in FIG. 6, each training datum L is obtained by a combination of a series of feature amounts Y and boundary data Bx. Boundary datum Bx of each training datum L corresponds to the correct answer value for the series of feature amounts Y in the training datum L. The boundary datum Bx includes a series of unit data b corresponding to the series of feature amounts Y. In other words, from among the unit data b included in the boundary datum Bx, unit datum b corresponding to the first unit period T of each consecutive period is set to "1". The remaining unit data b are set to "0".

Figure 7:
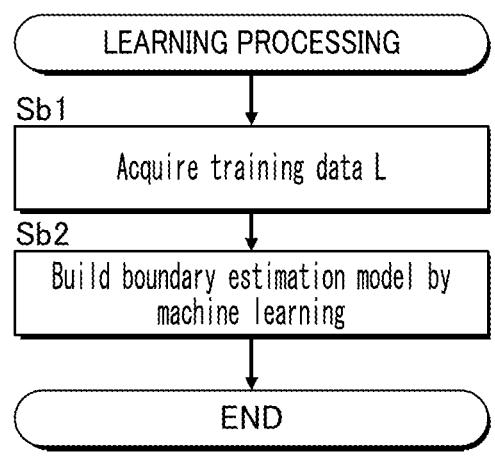
FIG. 7 is a flowchart showing an example of specific steps of building a boundary estimation model by machine learning.

FIG. 7 is a flowchart showing an example of the specific steps of building the boundary estimation model 22 executed by the learning processor 23. The learning processor 23 acquires training data L from the memory 12 (Sb1).

The learning processor 23 builds a boundary estimation model 22 by machine learning using training data L (Sb2). Specifically, the learning processor 23 inputs a series of feature amounts Y of the training data L. Then the learning processor 23 updates the coefficients K of the boundary estimation model 22 such that difference between the following (i) and (ii) is reduced: (i) the boundary data B output from a tentative boundary estimation model 22, and (ii) the boundary data Bx of the training data L. In one example, the learning processor 23 repeats the update of the coefficients K by use of an error back-propagation method such that an evaluation function representative of a difference between the boundary data B and the boundary data Bx is minimized. The coefficients K set by the learning processor 23 in the above steps are stored in the memory 12. Accordingly, the boundary estimation model 22 outputs statistically valid boundary data B for an unknown series of feature amounts Y, under potential tendency between (i) the series of feature amounts Y in the training data L and (ii) the boundary data Bx.

In the foregoing description, in this embodiment, relationships between a series of feature amounts Y and boundary data B are learned by the boundary estimation model 22. Then, feature amounts Y of an audio signal V are input into the trained boundary estimation model 22, and boundary data B are generated. In other words, the generation of the boundary data B is independent processing that requires no chord estimation. Another configuration is given in which a series of chords is estimated by analysis of an audio signal V, and each consecutive period is identified from the estimated series of chords. However, as compared to this configuration, in this embodiment, it is possible to analyze an audio signal V, and to estimate each consecutive period with high accuracy without being affected by the estimation result of the chords.

In this embodiment, an audio signal V includes audio components for different pitch classes. Each feature amount Y of the audio signal V includes, for each of the pitch classes, a component intensity depending on an intensity of a corresponding audio component. Such a feature amount Y is used for generating boundary data B. In the foregoing configuration, chords of a piece of music represented by an audio signal V are reflected in feature amounts Y, and each boundary between consecutive periods can be estimated with high accuracy by use of the feature amounts Y.

A refinement will be described. In each of the following examples, for elements having functions that are the same as those of the previous embodiment, reference signs used in the description of the previous embodiment will be used, and detailed description thereof will be omitted as appropriate.

In the previous embodiment, an example of binary boundary datum B is described, in which the boundary datum B represents, for each of the unit periods T, whether the unit period T corresponds to a boundary between consecutive periods. In this embodiment, boundary datum B represents, for each of the unit periods T, the likelihood that the unit period T is at a boundary between consecutive periods. Specifically, each unit datum b included in the boundary datum B is set to a numerical value ranging from 0 or more to 1 or less. The sum of the numerical values represented by unit data b is a predetermined value (e.g., 1). Among these unit data b, a unit period T corresponding to unit datum b having a larger numerical value is determined to be located at a boundary between consecutive periods. In this embodiment, the same effect as that of the previous embodiment is realized.

Examples of specific modifications that may be made to the foregoing embodiments will be described below Two or more modifications freely selected from among the examples below may be appropriately combined as long as they do not conflict with each other.

(1) In each foregoing embodiment, an example of the audio analyzer 100 is described, in which the audio analyzer 100 includes the boundary estimation model 22 and the learning processor 23.

However, the learning processor 23 may be provided on an information processing apparatus (hereinafter, referred to as a "machine learning apparatus") that is separate from the audio analyzer 100. In this case, the coefficients K may be set by the learning processor 23 of the machine learning apparatus, and may be applied to the boundary estimation model 22. The boundary estimation model 22 may be transferred to the audio analyzer 100 to estimate a boundary between consecutive periods. As is clear from the foregoing description, the learning processor 23 may be omitted from the audio analyzer 100.

(2) The audio analyzer 100 may be configured by a server apparatus that communicates with an information terminal, such as a cell phone, a smartphone, or other similar electrical devices. In one example, the audio analyzer 100 analyses an audio signal V received from the information terminal, generates boundary data B by the analysis, and transmits the generated boundary data B to the information terminal. In a case in which the information terminal extracts feature amounts Y from an audio signal V, the feature acquirer 21 of the audio analyzer 100 receives a series of feature amounts Y from the information terminal. The boundary estimation model 22 generates boundary data B from the series of feature amounts Y obtained by the feature acquirer 21. The boundary data B generated by the boundary estimation model 22 is transmitted to the information terminal. As is clear from the foregoing description, the feature acquirer 21 includes an element that extracts the feature amounts Y from the audio signal V as well as an element that receives the feature amounts Y from other devices, such as an information terminal.

(3) In each foregoing embodiment, an example of a feature amount Y including a chroma vector Q and an intensity P is described. However, the content of the feature amount Y is not limited to these examples. In one example, the chroma vector Q may be used alone as a feature amount Y.

In one example, for each frequency band of the audio signal V, feature amount Y may be generated, in which a chroma vector Q and an intensity P are included.

In one example, for each of the low-frequency band components and the high-frequency band components of an audio signal V, a feature amount Y including a chroma vector Q and an intensity P may be generated with respect to the given frequency.

(4) In each foregoing embodiment, boundary data B is displayed. However, use of the boundary data B generated by the boundary estimation model 22 is not limited to these examples. Specifically, a configuration is given in which a series of chords is estimated from an audio signal V by use of analysis techniques. In this configuration, the operation controller 24 may use the boundary data B generated by the boundary estimation model 22 to correct the time-series chords. In one example, the series of chords estimated from an audio signal V is corrected such that the same chord is continuous within each consecutive period represented by the boundary datum B.

The boundary data B may be used to control a variety of output apparatuses 13. In one example, a case is given in which the output apparatus 13 is applied to an automatic player apparatus (e.g., an automatic player piano) that performs automatic playing of a piece of music. In the automatic player apparatus, the performance style during automatic playing is changeable. During automatic playing of the piece of music represented by the audio signal V, the operation controller 24 controls the automatic player apparatus such that the performance style is changed for each consecutive period represented by the boundary datum B. In the foregoing configuration, it is possible to change musical expression of the automatic playing in a variety of ways for each consecutive period in the piece of music. Examples of the performance style include pattern of automatic playing and musical expression. Examples of the musical expression include tone, effect, volume, intensity, or technique.

In one example, a case is given in which the output apparatus 13 is applied to a lighting apparatus disposed in an acoustic space, such as in a Karaoke Box. The operation controller 24 controls the lighting apparatus such that condition of lighting is changed for each consecutive period represented by the boundary data B. Examples of the condition of lighting include lighting intensity, lighting color and lighting pattern. In the foregoing configuration, it is possible to change lighting by the lighting apparatus in a variety of ways for each consecutive period in a piece of music.

(5) As is described above, the audio analyzer 100 in each foregoing embodiment is created by collaboration between a computer (specifically, the controller 11) and a program. The program in each foregoing embodiment may be provided in a form stored on a computer-readable recording medium, and may be installed on a computer. The recording medium is a non-transitory recording medium, a typical example of which is an optical recording medium (an optical disk), such as a CD-ROM. However, examples of the recording medium may include any form of recording medium, such as a semiconductor recording medium or a magnetic recording medium. Examples of the non-transitory recording media may include any recording media except for transitory and propagating signals, and does not exclude volatile recording medias. The program may be provided to a computer in the form of distribution over a communication network.

That which executes of a program that generates the boundary estimation model 22 is not limited to a general-purpose processing circuit, such as a CPU. Specifically, the program may be executed by an artificial intelligence processing circuit, such as a Tensor Processing Unit or Neural Engine, or an electronic circuit for signal processing (e.g., Digital Signal Processor). Alternatively, the program may be executed by collaboration among multiple types of entities freely selected from the examples described above.

The following configurations are derivable in view of the foregoing embodiments.

A computer-implemented audio analysis method according to one aspect (Aspect 1) of this disclosure is an audio analysis method including: acquiring a series of feature amounts of an audio signal; and generating boundary data by inputting the acquired series of feature amounts into a boundary estimation model that has learned relationships between: (i) a series of feature amounts, and (ii) boundary data representative of boundaries, each boundary being between consecutive periods in each of which a chord is continuous.

According to this aspect, input of feature amounts of an audio signal into boundary estimation mode causes generation of boundary data regarding the audio signal. The boundary estimation mode is a mode that has learned relationships between: (i) a series of feature amounts, and (ii) boundary data representative of boundaries, each boundary being between consecutive periods in each of which a chord is continuous. That is, estimation of chords is no longer required for generation of the boundary data. Another configuration is given in which a series of chords is estimated by analysis of an audio signal, and each consecutive period is identified from the estimated series of chords. However, in this aspect, as compared to this configuration, it is possible to analyze an audio signal, and to estimate each consecutive period with high accuracy without being affected by the estimation result of the chords.

In one example (Aspect 2) according to Aspect 1, the audio signal includes audio components for different pitch classes, and each of the series of feature amounts of the audio signal includes, for each pitch class, a component intensity depending on an intensity of a corresponding audio component from among the audio components.

According to this aspect, chords of a piece of music represented by an audio signal are reflected in feature amounts, and each boundary between consecutive periods can be estimated with high accuracy by use of the feature amounts.

In one example (Aspect 3) according to Aspect 1 or 2, the boundary data is binary data indicating, for each of a plurality of time points on a time axis, whether a time point corresponds to a boundary between consecutive periods.

In one example (Aspect 4) according to Aspect 1 or 2, the boundary data represents, for each of a plurality of time points on a time axis, a likelihood that a time point corresponds to a boundary between consecutive periods.

In one example (Aspect 5) according to any one of Aspects 1 to 4, the audio analysis method further includes: controlling an output apparatus in accordance with the generated boundary data.

This configuration allows the output apparatus to be controlled in synchronization with the consecutive period in which a chord is continuous.

In one example (Aspect 6) according to Aspect 5, the output apparatus is a display apparatus, and the controlling of the output apparatus includes causing the display apparatus to display the consecutive periods represented by the generated boundary data.

This aspect allows the user to visually know the consecutive periods.

In one example (Aspect 7) according to Aspect 5, the output apparatus is an automatic player apparatus, and the controlling of the output apparatus includes controlling automatic playing by the automatic player apparatus in accordance with the generated boundary data.

This aspect allows automatic playing by the automatic player apparatus to be controlled for each consecutive period.

In one example (Aspect 8) according to Aspect 5, the output apparatus is a lighting apparatus, and the controlling of the output apparatus includes controlling conditions of lighting by the lighting apparatus in accordance with the generated boundary data.

This aspect allows conditions of lighting by the lighting apparatus to be controlled for each consecutive period.

In one example (Aspect 9) according to any one of Aspects 1 to 8, the audio analysis method further including correcting a series of chords estimated from the audio signal in accordance with the generated boundary data.

This aspect allows an appropriate correction series of chords estimated from the audio signal to be corrected appropriately.

This disclosure is achieved as an audio analyzer that implements the audio analysis method according to each foregoing embodiment, as well as a program that is implemented by a computer for executing the audio analysis method.

Examples will be given below. An audio analyzer according to one aspect of this disclosure is an audio analyzer including at least one memory, and at least one processor configured to execute a program stored in the at least one memory, in which the at least one processor configured to acquire a series of feature amounts of an audio signal, and generate boundary data by inputting the acquired series of feature amounts into a boundary estimation model that has learned relationships between (i) a series of feature amounts and (ii) boundary data representative of boundaries, each of the boundaries being between consecutive periods in each of which a chord is continuous.

An computer-implemented model building method according to one aspect of this disclosure is a model building method including acquiring training data, each including: (i) a series of feature amounts, and (ii) boundary data representative of boundaries, each boundary being between consecutive periods in each of which a chord is continuous, and building, by machine learning using the training data, a boundary estimation model that has learned relationships between: (i) a series of feature amounts, and (ii) boundary data representative of boundaries, each boundary being between consecutive periods in each of which a chord is continuous.

DESCRIPTION OF REFERENCE SIGNS

100 . . . audio analyzer, 11 . . . controller, 12 . . . memory, 13 . . . output apparatus, 21 . . . feature acquirer, 22 . . . boundary estimation model, 23 . . . learning processor, 24 . . . operation controller.

What is claimed is:

1. A computer-implemented audio analysis method comprising:
acquiring a series of feature amounts of an audio signal; and
generating boundary data by inputting the acquired series of feature amounts into a boundary estimation model that has learned relationships between: (i) a series of feature amounts, and (ii) boundary data representative of boundaries, each boundary being between consecutive periods in each of which a chord is continuous, wherein
the audio signal includes audio components for different pitch classes, and
each of the series of feature amounts of the audio signal includes, for each pitch class, a component intensity depending on an intensity of a corresponding audio component from among the audio components.

2. A computer-implemented audio analysis method comprising:
acquiring a series of feature amounts of an audio signal; and
generating boundary data by inputting the acquired series of feature amounts into a boundary estimation model that has learned relationships between: (i) a series of feature amounts, and (ii) boundary data representative of boundaries, each boundary being between consecutive periods in each of which a chord is continuous, wherein
the boundary data is binary data indicating, for each of a plurality of time points on a time axis, whether a time point corresponds to a boundary between consecutive periods.

3. A computer-implemented audio analysis method comprising:
acquiring a series of feature amounts of an audio signal; and
generating boundary data by inputting the acquired series of feature amounts into a boundary estimation model that has learned relationships between: (i) a series of feature amounts, and (ii) boundary data representative of boundaries, each boundary being between consecutive periods in each of which a chord is continuous, wherein
the boundary data represents, for each of a plurality of time points on a time axis, a likelihood that a time point corresponds to a boundary between consecutive periods.

4. The method according to claim 1, further comprising:
controlling an output apparatus in accordance with the generated boundary data.

5. The method according to claim 4, wherein
the output apparatus is a display apparatus, and
the controlling of the output apparatus includes causing the display apparatus to display the consecutive periods represented by the generated boundary data.

6. The method according to claim 4, wherein
the output apparatus is an automatic player apparatus, and
the controlling of the output apparatus includes controlling automatic playing by the automatic player apparatus in accordance with the generated boundary data.

7. The method according to claim 4, wherein
the output apparatus is a lighting apparatus, and
the controlling of the output apparatus includes controlling conditions of lighting by the lighting apparatus in accordance with the generated boundary data.

8. The method according to claim 1, further comprising:
correcting a series of chords estimated from the audio signal in accordance with the generated boundary data.

9. An audio analyzer comprising:
at least one memory; and
at least one processor configured to execute a program stored in the at least one memory, wherein
the at least one processor is configured to:
acquire a series of feature amounts of an audio signal; and
generate boundary data by inputting the acquired series of feature amounts into a boundary estimation model that has learned relationships between:

(i) a series of feature amounts, and (ii) boundary data representative of boundaries, each boundary being between consecutive periods in each of which a chord is continuous, the audio signal includes audio components for different pitch classes, and each of the series of feature amounts of the audio signal includes, for each of the different pitch classes, a component intensity depending on an intensity of a corresponding audio component from among the audio components.

10. An audio analyzer comprising:

at least one memory; and at least one processor configured to execute a program stored in the at least one memory, wherein the at least one processor is configured to:
acquire a series of feature amounts of an audio signal; and
generate boundary data by inputting the acquired series of feature amounts into a boundary estimation model that has learned relationships between: (i) a series of feature amounts, and (ii) boundary data representative of boundaries, each boundary being between consecutive periods in each of which a chord is continuous, and the boundary data is binary data indicating, for each of a plurality of time points on a time axis, whether a time point corresponds to a boundary between consecutive periods.

11. An audio analyzer comprising:

at least one memory; and at least one processor configured to execute a program stored in the at least one memory, wherein the at least one processor is configured to:
acquire a series of feature amounts of an audio signal; and
generate boundary data by inputting the acquired series of feature amounts into a boundary estimation model that has learned relationships between: (i) a series of feature amounts, and (ii) boundary data representative of boundaries, each boundary being between consecutive periods in each of which a chord is continuous, and the boundary data represents, for each of a plurality of time points on a time axis, a likelihood that a time point corresponds to a boundary between consecutive periods.

12. A computer-implemented model building method comprising:

acquiring training data, each including: (i) a series of feature amounts, and (ii) boundary data representative of boundaries, each boundary being between consecutive periods in each of which a chord is continuous; and building, by machine learning using the training data, a boundary estimation model that has learned relationships between: (i) a series of feature amounts, and (ii) boundary data representative of boundaries, each boundary being between consecutive periods in each of which a chord is continuous, wherein the boundary data is binary data indicating, for each of a plurality of time points on a time axis, whether a time point corresponds to a boundary between consecutive periods.

13. A computer-implemented model building method comprising:

acquiring training data, each including: (i) a series of feature amounts, and (ii) boundary data representative of boundaries, each boundary being between consecutive periods in each of which a chord is continuous; and building, by machine learning using the training data, a boundary estimation model that has learned relationships between: (i) a series of feature amounts, and (ii) boundary data representative of boundaries, each boundary being between consecutive periods in each of which a chord is continuous, wherein the boundary data represents, for each of a plurality of time points on a time axis, a likelihood that a time point corresponds to a boundary between consecutive periods.

14. The method according to claim 2, further comprising: controlling an output apparatus in accordance with the generated boundary data.

15. The method according to claim 3, further comprising: controlling an output apparatus in accordance with the generated boundary data.

16. The method according to claim 2, further comprising: correcting a series of chords estimated from the audio signal in accordance with the generated boundary data.

17. The method according to claim 3, further comprising: correcting a series of chords estimated from the audio signal in accordance with the generated boundary data.

* * * * *